United States Patent [19]
Gill

[11] Patent Number: 5,832,617
[45] Date of Patent: Nov. 10, 1998

[54] EASY TOE ADJUSTMENT

[75] Inventor: George Michael Gill, Vilonia, Ark.

[73] Assignee: Snap-on Technologies, Inc., Lincolnshire, Ill.

[21] Appl. No.: 846,459

[22] Filed: May 1, 1997

[51] Int. Cl.[6] .................................................. G01B 11/275
[52] U.S. Cl. .......................... 33/203; 33/203.18; 33/600; 356/139.09
[58] Field of Search ................................. 33/203, 203.12, 33/203.13, 203.14, 203.15, 203.18, 203.19, 600, 286, DIG. 21; 356/139.09

[56] References Cited

U.S. PATENT DOCUMENTS

| 4,429,467 | 2/1984 | Murata et al. | 33/203.15 |
| 5,105,546 | 4/1992 | Weise et al. | 33/203.12 |
| 5,165,179 | 11/1992 | Schoeninger | 33/600 |
| 5,208,646 | 5/1993 | Rogers et al. | 33/288 |
| 5,335,420 | 8/1994 | Kling, III et al. | 33/203.18 |
| 5,553,389 | 9/1996 | Winslow et al. | 33/203.18 |

*Primary Examiner*—Christopher M. Fulton
*Attorney, Agent, or Firm*—Niro, Scavone, Haller & Niro

[57] ABSTRACT

A method for adjusting toe on a steerable vehicle wheel including the steps of obtaining and storing a preadjustment toe value for a first wheel, moving the first wheel to a adjust position, obtaining and storing an initial toe value for both steerable wheels when the first wheel reaches its adjust position, adjusting toe angle on the first wheel, using the preadjusted toe value and initial toe value for the pair of wheels to obtain an adjusted toe value for the first wheel, and continuing the adjustment of toe angle on the first wheel until the adjusted toe value is substantially within a first wheel toe specification, whereby toe is adjusted without locking the steering wheel.

17 Claims, 4 Drawing Sheets

LEVEL STEERING WHEEL

LEVEL HEADS

STEER TO ADJUST POSITION

FRONT TRACK TOE
SENSOR RANGES

EASY TOE ADJUSTMENT

BACKGROUND OF THE INVENTION

The present invention relates to alignment systems for vehicle wheels, and more specifically, to a method and apparatus for adjusting toe in a pair of steerable wheels.

Proper toe angle adjustment in vehicle wheels is important to reduce tire wear and to insure good handling. Toe angle is the angle between the plane of the vehicle wheel and an imaginary line running generally along the length of the vehicle. Sometimes this imaginary line is the thrust line, that is, the line along which the vehicle actually moves. Sometimes the imaginary line is the geometric centerline of the vehicle, also known as the body centerline. The geometric centerline is a line bisecting a vehicle along its length. Other reference lines may also be used to determine toe.

All vehicles are associated with recommended toe values, published as specifications. For example, a vehicle might have a right front toe specification of 1° and a left front toe specification of 1°. The specifications are often expressed as ranges, since precise values are often difficult to maintain and not necessary to achieve. A range might be from 0.70° to 1.3°, for instance.

When toe is out of specification in one or more wheels, a driver might notice poor handling, such as a pull to the left or a pull to the right in the steering. If bad enough, this might rise to the level of a safety hazard. Even absent noticeable effects on handling, out of spec toe can result in severe tire wear and associated replacement expense if not corrected early.

Typical toe alignment procedures require that each wheel be adjusted while the steering wheel is in a locked position. This is to prevent movement of the wheels while an adjustment is made. Adjustments are typically made by rotating a turnbuckle in the undercarriage near the wheel, or performing other mechanical operations to change toe angle. In the past, if the steering wheel was free to move while these adjustments were made, the mechanic would endanger angle sensor readings by jostling the wheel. Locking the steering wheel provided a solution, but the solution caused other problems. An extra piece of bulky equipment was required to perform the lock. A locking step to an alignment procedure added a further complication. Mechanics had to be trained in this further step, which takes time. Mechanics sometimes locked the steering wheel off center, thereby causing the adjustments to come out wrong. Mechanics also sometimes forgot entirely to lock the steering wheel, virtually assuring misalignment of the vehicle wheels and the associated safety hazards. U.S. Pat. No. 5,165,179, issued to Schoeninger, whose teachings are incorporated herein by reference, discloses one such prior art method requiring a steering wheel lock.

U.S. Pat. No. 5,553,389, issued to Winslow et al., whose teachings are also incorporated herein by reference, discloses a system for adjusting toe without the use of a steering wheel lock. But Winslow requires that specification values for "total toe" be utilized in the process, when it is individual toe that needs to be adjusted. Winslow also makes no accommodation for turning the wheels to allow the mechanic easier access to the toe adjusting mechanism.

It is an object of the present invention to overcome these disadvantages. In particular, it is an object of the invention to make toe adjustment easy for the operator of a vehicle wheel alignment adjustment device.

It is also an object of the present invention to provide an improved method and apparatus for adjusting vehicle toe angles.

It is a still further object of the invention to provide toe angle adjustment without the need for a steering wheel lock.

Another object of the invention is to perform toe adjustment while the wheels are turned at angles allowing easy access to the toe adjustment mechanism.

Yet another object of the invention is to provide an apparatus that instructs a user on how to perform the novel method.

Still another object of the invention is to allow accurate toe angle measurements and adjustments to be performed even when the wheels under adjustment are inadvertently jostled or moved by the operator.

Other objects and features will be apparent in view of the detailed disclosure herein.

SUMMARY OF THE INVENTION

In one aspect, the invention is a method for adjusting toe on a steerable vehicle wheel including the steps of obtaining and storing a preadjustment toe value for a first wheel, moving the first wheel to an adjust position, obtaining and storing an initial toe value for both steerable wheels when the first wheel reaches its adjust position, adjusting toe angle on the first wheel, using the preadjusted toe value and initial toe value for the pair of wheels to obtain an adjusted toe value for the first wheel, and continuing the adjustment of toe angle on the first wheel until the adjusted toe value is substantially within a first wheel toe specification, whereby toe is adjusted without locking the steering wheel. The adjusted toe value for the first wheel is obtained by a mathematical algorithm that removes the effect of any jostling or moving of the wheels.

In another aspect, the invention is an apparatus that assists the operator in adjustment of toe angles in a pair of steerable wheels. The apparatus includes a set of sensors that are mounted on a plurality of vehicle wheels. The sensors are connected to a controller, which is further connected to a display. The sensors include a prism and lens structure causing a refraction that extends the turning range of the steerable wheels while angles are measured. The controller uses the sensor input to instruct the operator via the display on how to adjust toe without the need for a steering wheel lock. The apparatus allows instantaneous measurement of toe angles even when the steering is turned to the left or the right, compares the measured toe with specification values for each individual wheel, and instructs the operator on the direction and amount of adjustment to make.

DESCRIPTION OF THE PREFERRED EMBODIMENT

Those of skill in the art will recognize that the objects of the invention may be achieved, and the claims herein may be practiced, by other embodiments without departing from the scope of the invention.

Figure 1:
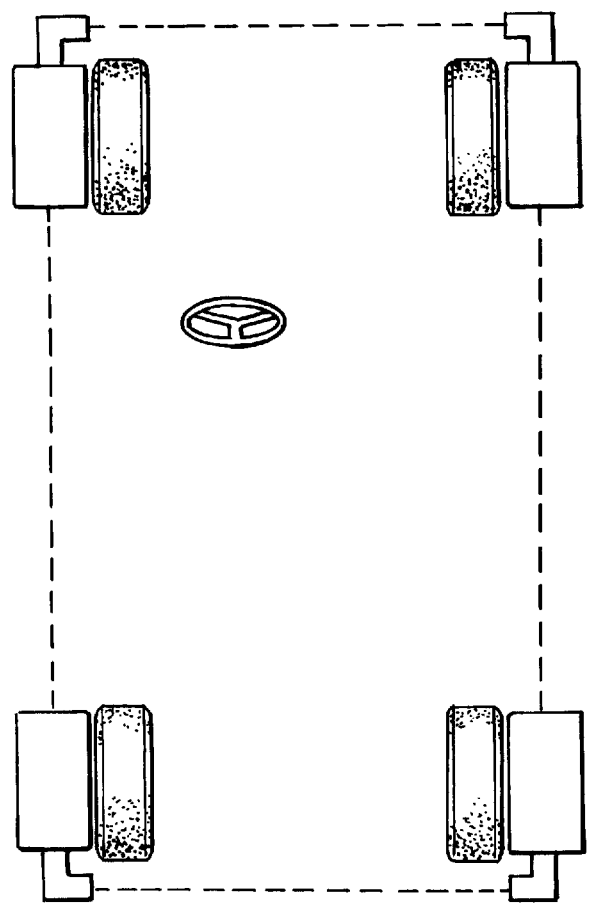
FIG. 1 is a plan view schematic of the arrangement of sensor heads for the novel apparatus in operation.

FIG. 1 shows a plan view schematic representation of a set of four vehicle wheels equipped with mounted sensor heads. The sensors are coupled to a controller (not shown), which is in turn coupled to a display. U.S. Pat. No. 5,208, 646, assigned to the assignee herein and incorporated by reference, generally describes the structure of a vehicle wheel alignment apparatus including sensors, a controller and a display. The VISUALINER series of automotive alignment equipment, manufactured by the John Bean Corporation (the assignee herein), is preferred for supplying these elements. The VISUALINER controller has stored within it all published vehicle alignment specifications, such as for individual toe specifications.

Each sensor head contains an associated pair of sensors. In operation, there are eight sensors in total. The sensor heads operate by sending infrared source signals that are picked up by sensors (receivers) on adjacent sensor heads. These infrared signals are then interpreted by the controller to indicate wheel alignment angles. For instance, the front left wheel's sensor head will have one source for sending an infrared signal across to a sensor on the right front wheel, and will also have one source for sending an infrared signal laterally to a sensor on the left rear wheel.

Figure 2:
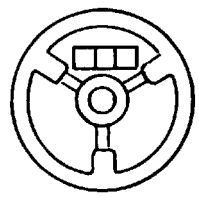
FIG. 2 is a display screen for the novel apparatus in operation.

An automobile to be adjusted is placed in an alignment bay so that its steerable wheels rest on turntables. An operator begins a toe alignment by selecting this option from a display on the alignment machine. Once toe alignment is selected, the machine displays a screen instructing the operator to level the steering wheel and the heads (FIG. 2). The operator levels the heads with the ground. The steering wheel is leveled by turning it to its center straight ahead position. The operator at this point tells the machine that the steering wheel and the heads are level, for instance by pressing a button on the machine.

The controller now obtains the sensor readings indicating left preadjusted front toe and right preadjusted front toe. These sensor readings are stored in controller memory. For instance, the values might be saved as variables InitialLFToe and InitialRFToe.

Figure 3:
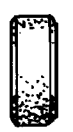
FIG. 3 is another display screen for the novel apparatus in operation.
Figure 3:
Figure 3:
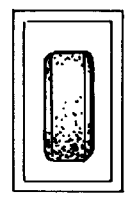
Figure 3:
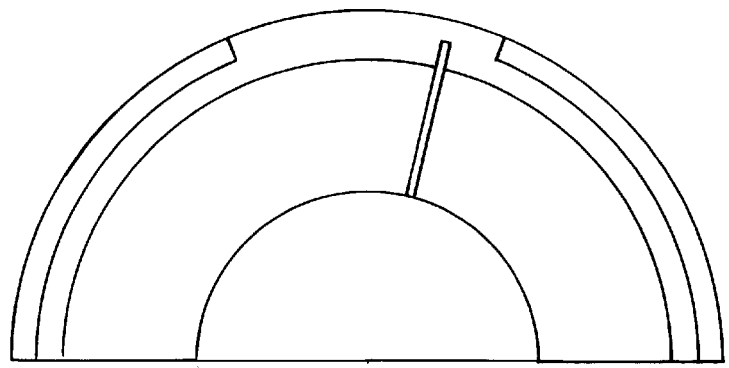
Figure 4:
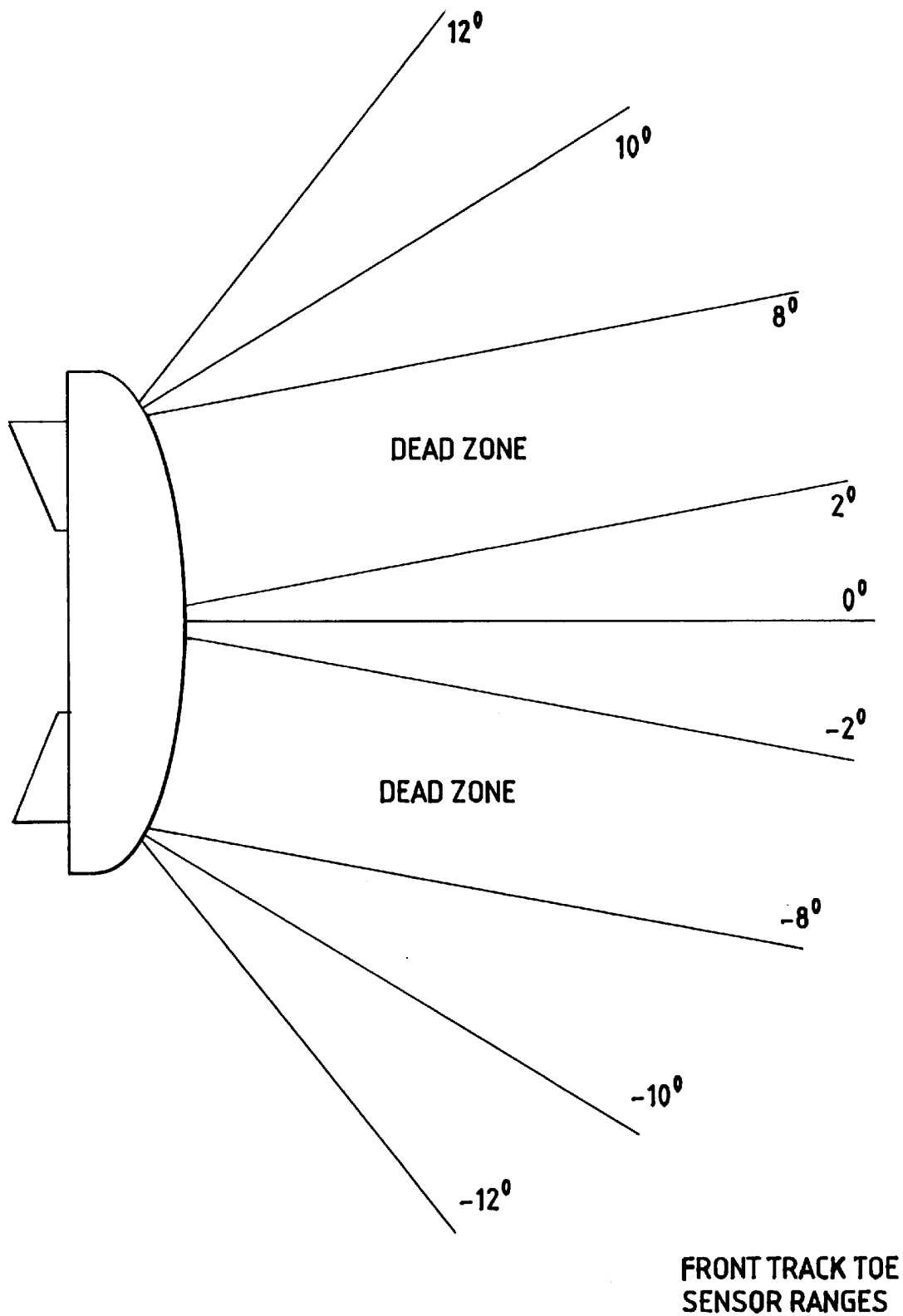
FIG. 4 is a schematic representation of the prism and lens structure within the sensor heads of the novel apparatus.

Turning now to FIG. 3, the display then changes. It now instructs the operator to move the right wheel to an adjust position. This position is anywhere in a four degree range, which is the normal angle sensing range of the VISUALINER sensor heads. This four degree range can be centered at zero degrees. It can also be centered at either ten degrees steered to the left or ten degrees steered to the right. As shown in FIG. 4, the VISUALINER sensor heads contain a prism and lens structure located just ahead of the infrared sources that allows accurate angle signals to be received both at zero degrees center and at ten degrees center. The prism creates a refraction causing a ten degree shift in the optical image. Thus, the adjust position may be inside eight to twelve degrees, two to minus two degrees, or minus eight to minus twelve degrees (with positive and negative indicating to the left and to the right, respectively, or vice versa).

As shown in FIG. 3, the display contains a metered gauge that provides a visual indication of the direction and magnitude of change necessary to reach or maintain the center of the adjust position. The operator moves the steerable wheels on the turntable, or moves the steering wheel itself, to center the indicator on the display. If the toe adjustment mechanism is hard to reach with the wheels at a straight ahead position, the operator may turn the wheels ten degrees. The same indicator gauge on the display will allow the wheels to be centered at ten degrees. Once centered, the operator tells the machine, for instance by pressing a button. It will be appreciated that the controller may easily be programmed to recognize when the adjustment position is properly reached, obviating the need for the operator to press a button to go to the next step.

It will be understood by those of skill in the art that the selection of alternative angles is arbitrary, and any second centered adjust position may be implemented simply by altering the prism and lens structure to create the proper refraction angle accordingly.

At this point, the controller obtains from the sensors readings indicating toe angle for each front wheel along the length of the vehicle, otherwise known as "track toe" (to distinguish from "cross toe," which is the toe signal calculated from across the width of the vehicle). These values are stored in controller memory. For instance, the values might be saved as variables InitialLFTrackToe and InitialRFTrackToe.

Figure 5:
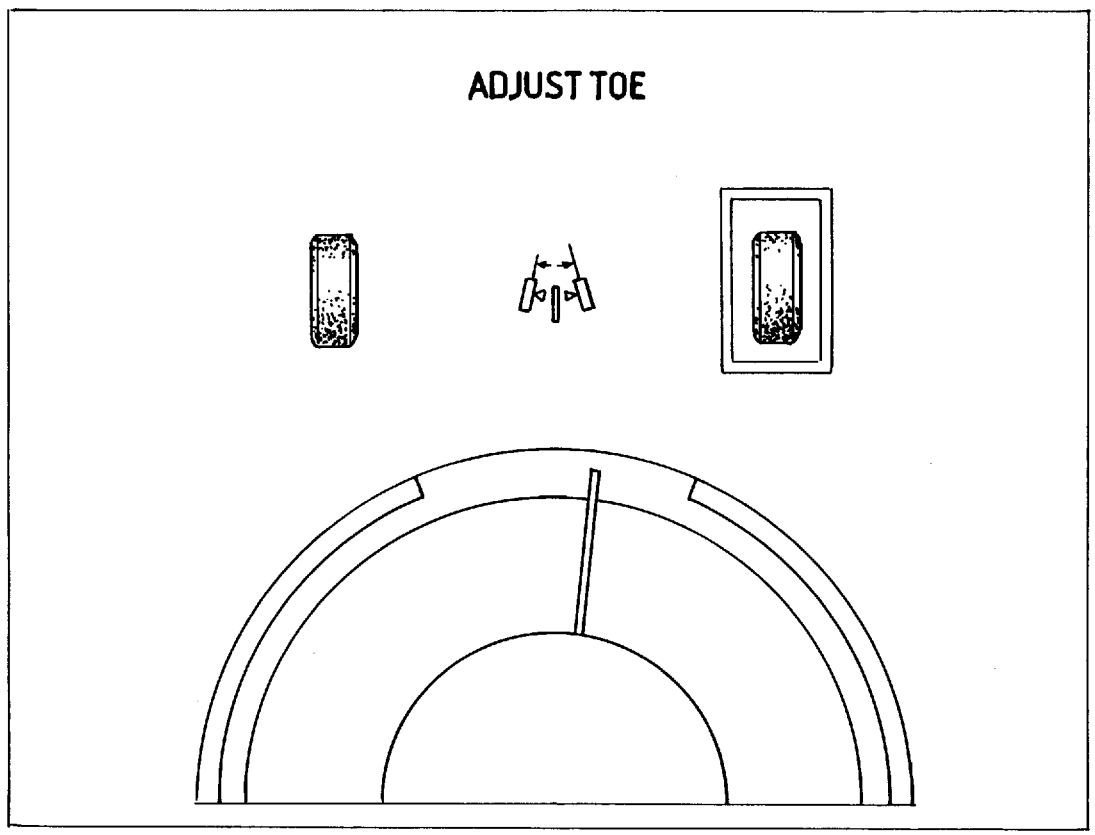
FIG. 5 is still another display screen for the novel apparatus in operation.

Turning to FIG. 5, the display then changes again. It now instructs the operator to adjust the right front toe. This is done in the conventional manner, such as by turning a turnbuckle or whatever other mechanism resides in the undercarriage for making toe adjustments. The controller keeps track of the right front toe by use of the following mathematical relationship:

$$\text{Right Front Toe} = \text{InitialRFToe} - ((\text{InitialRFTrackToe} - \text{CurrentRightTrackToe}) + (\text{InitialLFTrackToe} - \text{CurrentLeftTrackToe})),$$

where CurrentRightTrackToe and CurrentLeftTrackToe are real time variables indicating instantaneous values for track toe for the right and left front wheels, respectively. Using such a relationship makes toe measurements insensitive to unintentional jostling of the wheel during adjustment.

The display of FIG. 5 contains a metered gauge, and also contains an indicator that tells the operator the magnitude and direction of the change necessary to effect the adjustment. This gauge visually represents the proper specification range for right front toe. When the indicator reaches the center of the gauge, right front toe is adjusted. The operator now tells the controller to move forward to the next step in the procedure, as by pressing a button. It will be appreciated that the controller may easily be programmed to recognize when toe is properly adjusted, obviating the need for the operator to press a button to go to the next step.

With the right front wheel adjusted, the above is now performed with respect to the left front wheel. The display instructs the operator to move the left front wheel to the adjust position. As before, the display contains a metered gauge that provides a visual indication of the direction and magnitude of change necessary to reach or maintain the center of the adjust position. The operator moves the steerable wheels on the turntable, or moves the steering wheel itself, to center the indicator on the display. If the toe adjustment mechanism is hard to reach with the wheels at a straight ahead position, the operator may turn the wheels ten degrees. The same indicator gauge on the display will allow the wheels to be centered at ten degrees. Once centered, the operator tells the machine that now the left front wheel is in its adjust position, for instance by pressing a button.

At this point, the controller obtains from the sensors readings indicating track toe angle for each front wheel along the length of the vehicle. For instance, the values might be saved as variables InitialLFTrackToe and InitialRFTrackToe.

As before, the display then changes again. It now instructs the operator to adjust the left front toe. This is again done in the conventional manner, such as by turning a turnbuckle or whatever other mechanism resides in the undercarriage for making toe adjustments. The controller keeps track of the left front toe by use of the following mathematical relationship:

$$\text{Left Front Toe} = \text{InitialLFToe} - ((\text{InitialRFTrackToe} - \text{CurrentRightTrackToe}) + (\text{InitialLFTrackToe} - \text{CurrentLeftTrackToe})).$$

As before, the display contains a metered gauge, and also contains an indicator that tells the operator the magnitude and direction of the change necessary to effect the adjustment. This gauge visually represents the proper specification range for left front toe. When the indicator reaches the center of the gauge, left front toe is adjusted. With toe adjusted on both wheels, the procedure is complete.

The preferred embodiment is presented only as illustrative of what is claimed, and should not be construed to be limiting. It will be apparent that the various objects and features of the present invention are achieved by alternative embodiments.

I claim:

1. A method for adjusting toe on a steerable vehicle wheel comprising:
   obtaining and storing a preadjusted toe value for a first one of a pair of steerable vehicle wheels;
   moving the first wheel to an adjust position;
   obtaining and storing an initial toe value for the pair of wheels upon the first wheel reaching the adjust position;
   adjusting toe angle on the first wheel;
   using the values of preadjusted toe and initial toe for the pair of wheels to obtain an adjusted toe value for the first wheel;
   continuing the adjustment of toe angle on the first wheel until the adjusted toe value is substantially within a first wheel toe specification,
   whereby toe is adjusted without locking a steering wheel.

2. The method of claim 1 wherein the adjust position is substantially straight ahead with respect to one of either a thrust line or a geometric centerline.

3. The method of claim 1 wherein the adjust position is substantially ten degrees to the left or right with respect to one of either a thrust line or a geometric centerline.

4. The method of claim 1 wherein the adjust position is in the range of two degrees on either side of one of either a thrust line or a geometric centerline.

5. The method of claim 1 wherein the adjust position is in the range of eight to twelve degrees on either side of one of either a thrust line or a geometric centerline.

6. The method of claim 1 wherein preadjusted toe value is obtained with reference to one of either a thrust line or a geometric centerline.

7. The method of claim 1 wherein the initial toe value comprises an initial track toe value.

8. The method of claim 7 wherein the step of using the values of preadjusted toe and initial toe for the pair of wheels to obtain an adjusted toe value for the first wheel comprises subtracting the difference between the initial track toe value and a current track toe value from the preadjusted toe value to obtain an adjusted toe value.

9. The method of claim 8 wherein the initial and current track toe value comprise left and right initial and current track toe values, respectively.

10. The method of claim 1 further comprising:
    obtaining and storing a second preadjusted toe value for a second one of the pair of steerable vehicle wheels;
    moving the second wheel to an adjust position;
    obtaining and storing a second initial toe value for the pair of wheels upon the second wheel reaching the adjust position;
    adjusting toe angle on the second wheel;
    using the values of second preadjusted toe and second initial toe for the pair of wheels to obtain a second adjusted toe value for the second wheel;
    continuing the adjustment of toe angle on the second wheel until the second adjusted toe value is substantially within a second wheel toe specification,
    whereby toe on the pair of wheels is adjusted without locking the steering wheel.

11. Vehicle wheel alignment angle adjustment apparatus comprising a plurality of wheel alignment angle sensors, the sensors coupled to a controller, the controller coupled to a display, the controller further comprising a memory with wheel toe specification values stored therein, the improvement comprising:
    means for instructing an operator to turn a vehicle wheel to an adjustment position without locking a steering wheel; and
    calculation means for determining a real-time value for an individual wheel toe angle that is insensitive to said operator's turning of the vehicle wheel,
    whereby the real-time toe value may be compared with an individual wheel toe specification value to allow the operator to adjust the toe value to within specification while the vehicle wheel is in the adjustment position.

12. The apparatus of claim 11 wherein the calculation means comprises means for storing a preadjustment value of the individual wheel toe prior to the operator's turning the vehicle wheel, means for storing the adjustment wheel toe angle once the vehicle wheel is turned to its adjustment position, and means for adding to the preadjustment value the difference between current toe angle and the adjustment toe angle to obtain the real-time value.

13. The apparatus of claim 11 wherein the adjustment position substantially comprises minus fifteen degrees to plus fifteen degrees with respect to either geometric centerline or thrust line.

14. The apparatus of claim 13 wherein the adjustment position substantially comprises minus ten degrees to plus ten degrees with respect to either geometric centerline or thrust line.

15. The apparatus of claim 14 wherein the adjustment position substantially comprises one from the following list: minus ten degrees, zero degrees, plus ten degrees.

16. The apparatus of claim 11 wherein the adjustment position comprises a range of four degrees.

17. The apparatus of claim 11 wherein the means for instructing further comprises means for instructing the operator to perform a toe adjustment subsequent to the turning of the vehicle wheel to the adjustment position.

* * * * *